United States Patent [19]

Romano

[11] Patent Number: 4,878,395

[45] Date of Patent: Nov. 7, 1989

[54] DEVICE FOR OPERATING THE GEAR CHANGE OF A BICYCLE

[75] Inventor: Antonio Romano, Padoua, Italy

[73] Assignee: Campagnolo S.p.A., Vicenza, Italy

[21] Appl. No.: 150,857

[22] Filed: Feb. 1, 1988

[30] Foreign Application Priority Data

Apr. 29, 1987 [IT] Italy .................. 67368 A/87

[51] Int. Cl.⁴ .............................................. G05G 5/06
[52] U.S. Cl. ........................................ 74/531; 74/489;
74/502.2; 74/523
[58] Field of Search .............. 74/475, 489, 523, 502.2,
74/527, 531

[56] References Cited

U.S. PATENT DOCUMENTS

| | | | |
|---|---|---|---|
| 3,943,794 | 3/1976 | Shimada | 74/489 |
| 4,223,563 | 9/1980 | Kine | 74/489 |
| 4,470,823 | 9/1984 | Shimano | 74/475 |
| 4,723,462 | 2/1988 | Coué | 74/531 |

FOREIGN PATENT DOCUMENTS 520102 of 1953 Italy ..................... 74/489

Primary Examiner—Gary L. Smith
Assistant Examiner—Flemming Saether
Attorney, Agent, or Firm—Sughrue, Mion, Zinn, Macpeak & Seas

[57] ABSTRACT

A device for operating the gear change of a bicycle comprises a main body mounted rotatably on a support pin and provided with an operating lever. A member driven by the main body and whose rotation is prevented by friction coupling means is also mounted rotatably on the support pin. Interposed between the driven member and the main body are one-way engagement means for coupling the driven member to the main body for rotation only when the operating lever is rotated in the direction of return of the derailer spring. These one-way engagement means are controlled directly by the same operating lever, which is constituted by an element separate from the main body and articulated to this body.

7 Claims, 2 Drawing Sheets

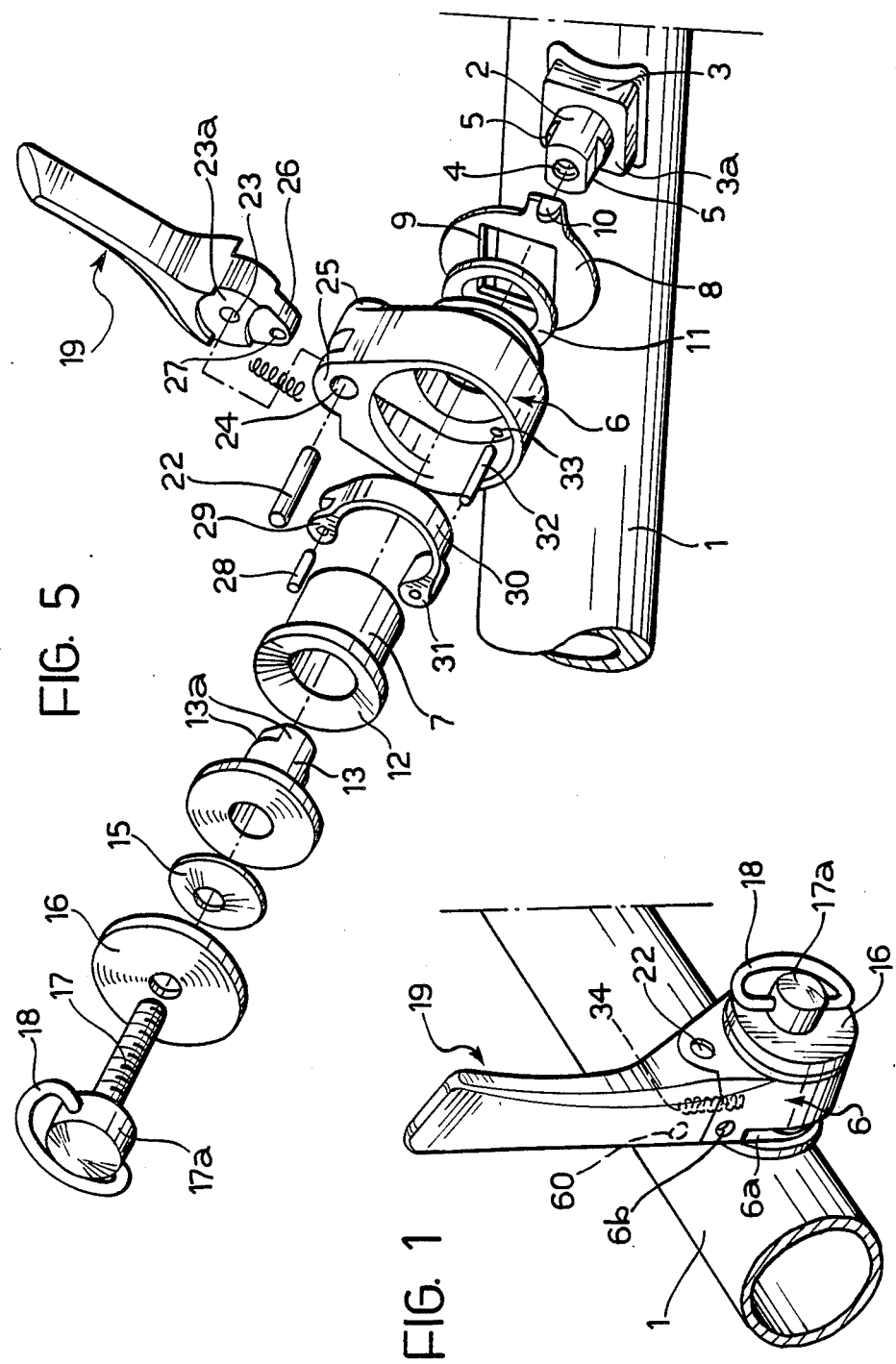

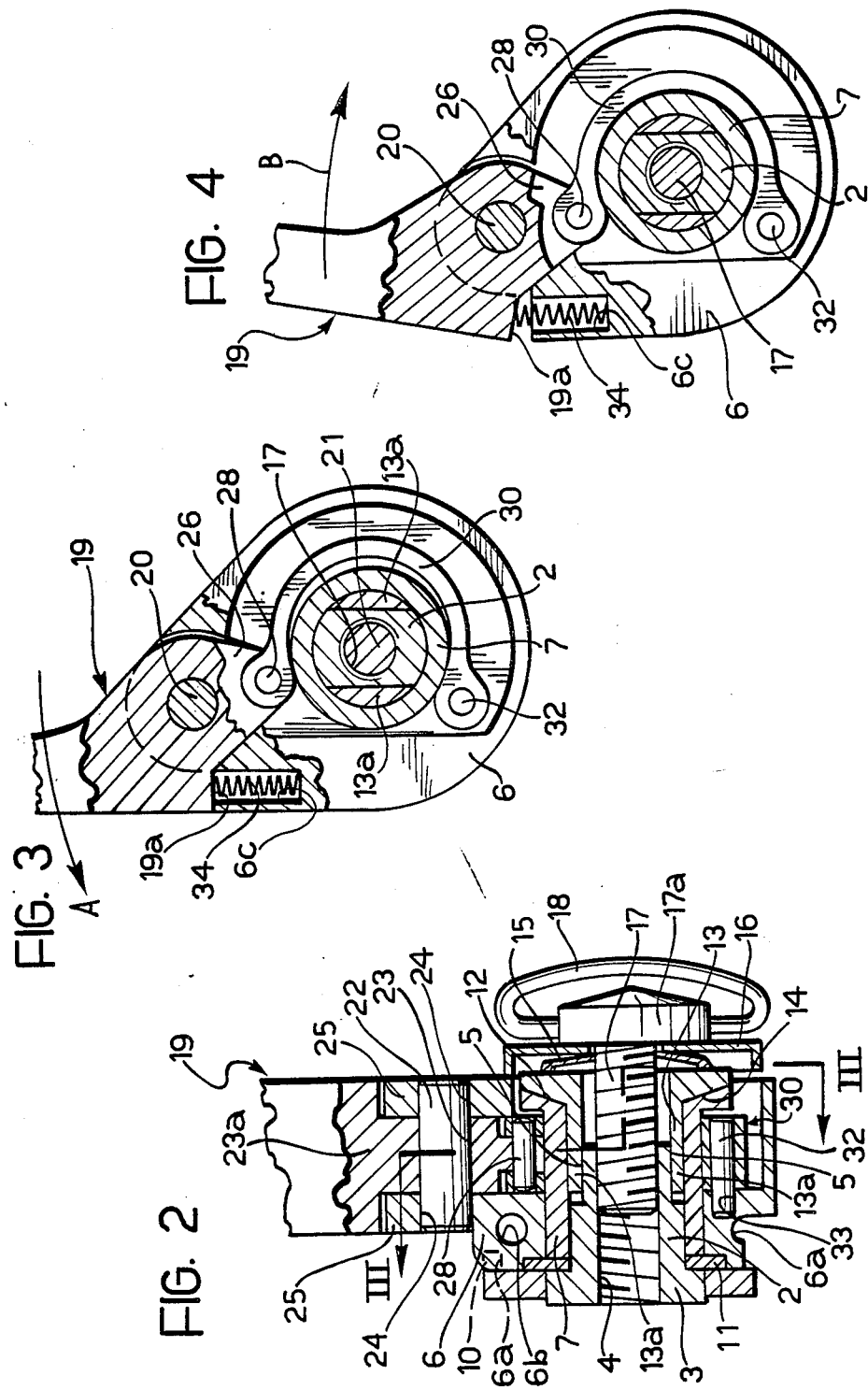

DEVICE FOR OPERATING THE GEAR CHANGE OF A BICYCLE

BACKGROUND OF THE INVENTION

The present invention relates to devices for operating the gear change of a bicycle, of the type comprising a main body rotatably mounted on a support pin and provided with an operating lever which is resiliently biassed towards one of its end positions, a member driven by the main body and rotatably mounted on the support pin, friction coupling means operatively interposed between the driven member and the support pin for opposing rotation of the driven member by means of frictional resistance, and one-way engagement means operatively interposed between the main body and the driven member for coupling the driven member to the main body for rotation only when the operating lever is rotated towards the said end position.

In devices of the type specified above, the main body of the device is connected to the rear derailer of the bicycle by means of a Bowden cable. The derailer includes a spring which tends to urge the operating lever towards the position corresponding to engagement of the bicycle chain with the smallest-diameter sprocket carried by the rear wheel of the bicycle. When the lever is released in a position other than the above position, movement of the lever due to the biassing of the derailer spring is prevented by the friction generated by the friction coupling means. When the operator operates the lever, moving it towards to end position, he has to overcome this friction and is assisted in this operation by the derailer spring. When the operator needs to move the lever away from the end position, however, he only has to overcome the reaction of the derailer spring, since the one-way engagement means enable the main body of the device to rotate freely relative to the driven member. In this way, the force which has to be applied by the cyclist to the operating lever remains substantially unaltered, whatever the direction of movement of the lever.

An operating device of the type indicated at the beginning of the present description is described and illustrated in U.S. Pat. No. 3,693,469. In this known solution, the one-way engagement means are constituted by a ratchet gear comprising a pawl carried by the main body of the operating lever and a toothed wheel which itself constitutes the driven member of the device. This known solution, however, is not always completely satisfactory in use. Other devices of the type indicated above have also been suggested, but have the disadvantage of being relatively complicated, or of requiring manufacture to very low tolerances, or even of enabling engagement only in a fixed number of positions.

SUMMARY OF THE INVENTION

The object of the present invention is to produce a device of the above-specified type which overcomes the problems indicated above and which is particularly simple and reliable.

The main characteristic of the device according to the invention lies in the fact that the one-way engagement means comprise a mechanism for engaging the driven member, which can be deactivated, is carried by the main body, and is adapted to connect the main body for rotation with the driven member, and in that the operating lever is constituted by an element separate from the main body and mounted on the main body so as to be movable relative thereto between a first operative position towards which the lever is resiliently biassed and in which it activates the engagement mechanism, and a second operative position in which the lever deactivates the engagement mechanism.

In a prefered embodiment, the driven member is constituted by a bush rotatably mounted on the support pin and the engagement mechanism is constituted by a clamp partially surrounding the bush and articulated at one end to the main body of the device and at the opposite end to the operating lever, the clamp being adapted to grip the bush within it when the operating lever is in the operative position.

BRIEF DESCRIPTION OF THE INVENTION

The present invention will now be described with reference to the appended drawings, provided purely by way of non-limiting example, in which:

FIG. 1 is a perspective view of the operating device according to the invention, FIG. 2 is a section of the device of FIG. 1, FIG. 3 is a section taken on the line III—III of FIG. 2, FIG. 4 is a section corresponding to that of FIG. 3, showing the device in a different operative condition, and FIG. 5 is an exploded perspective view of the device of FIG. 1.

In the drawings, a tubular member forming part of a bicycle frame is indicated 1, and a pin 2 is fixed thereto for supporting the device according to the invention. In the embodiment illustrated, the pin 2 projects from a square base 3 and has an axial threaded hole 4 and two opposite parallel flat faces 5 (FIG. 5). The main body of the device is generally indicated 6 and is rotatably mounted on the support pin 2 with the interposition of a bush 7 (FIGS. 2, 5). A retaining plate 8 is mounted on the square base 3 of the support pin 2 and has a central aperture 9 whose shape and dimensions correspond to those of the base 3, so that the plate 8 is locked against rotation. The plate 8 includes a retaining appendage 10 projecting from its plane, which is obtained by bending of the sheet metal forming the plate and cooperates with a curved groove 6a (FIG. 2) formed in the main body 6 to define the end positions of the angular travel of the main body relative to the support pin 2. Also mounted on the pin 2 is a washer 11 which bears on the flat abutment surface 3a of the base 3 (FIG. 5) and on which the bush 7 and the main body 6 bear in their turn (FIG. 2). On the side opposite the washer 11, the bush 7 has an enlarged end which has a conical opening 12 in the embodiment illustrated. An auxiliary bush having an outside diameter equal to the diameter of the support pin 2 is indicated 13 and is provided with two axial appendages 13a with flat facing surfaces in contact with the flat faces 5 of the support pin 2. As a result of this arrangement, the auxiliary bush 13 is free to move axially relative to the support pin 2, but is locked against rotation by engagement with this pin. At the same time, the bush 7 is mounted for free rotation on both the pin 2 and the auxiliary bush 13. The bush 13 also has an enlarged end having an external conical surface 14 with the same taper as the surface of the opening 12 of the bush 7. These conical surfaces are urged into contact with each other by a Belleville washer 15 interposed between the end surface of the auxiliary bush 13 and a cover 16, the Belleville washer 15 and the cover 16 being mounted on a screw 17 which engages the axial threaded hole 4 of the support pin 2. In the embodiment illustrated, the head 17a of the screw 17 is provided with an articulated ring 18 which enables it to be adjusted manually.

The operating lever of the device is indicated 19 and is constituted by an element separate from the main body 6 and articulated to the main body about an axis 20 (FIG. 3) parallel to the axis 21 (FIG. 3) of the support pin 2 by means of an articulation pin 22 which engages a hole 23 (FIGS. 2, 5) formed in a flattened portion 23a of the element constituting the lever 19. The pin 22 also engages holes 24 formed in two flattened appendages 25 of the body 6 which are parallel to each other and spaced apart, and between which the flattened portion 23a of the lever 19 is interposed. In the embodiment illustrated, the main body 6 has a groove 6a for guiding the derailer operating cable and a hole 6b for attachment of the end of this cable.

At the end opposite its grip, the operating lever 19 has an end 26 with a hole 27. The hole 27 is engaged by a pin 28 which articulates the end 26 of the lever 19 to a fork-shaped end 29 of a clamp 30 (FIG. 5) whose opposite end 31 is articulated to the body 6 of the device by a pin 32 (FIGS. 2, 5). The pin 32 is mounted with interference in a seat 33 formed in the inner surface of the body 6. The clamp 30 surrounds the bush 7 by an angle greater than 180° and can assume the two different operative positions illustrated respectively in FIGS. 3 and 4, as will be described in more detail below. The main body 6 of the device has a cylindrical blind hole 6c facing a surface 19a of the operating lever 19 (FIG. 3, 4). A helical spring 34 is interposed between the base of the blind hole 6c and the surface 19a. When the cyclist is not acting on the operating lever, the spring 34 keeps the operating lever 6 in the position shown in FIG. 4, relative to the main body 6 of the device. In this position, the clamp 30 grips the bush 7 tightly within it, so that the main body 6 is coupled for rotation with this bush. When the operating lever 19 is rotated relative to the main body 6 into the position shown in FIG. 3, against the action of the helical spring 34, the clamp 30 moves away from the bush 7 so that the main body 6 can rotate freely relative to this bush.

As already indicated above, the rear derailer of the bicycle, to which the cable leading to the main body 6 is connected, includes a spring (not illustrated) which tends to keep the main body 6 in the position corresponding to engagement of the bicycle chain with the smallest-diameter sprocket of the set of sprockets carried by the rear wheel of the bicycle. When the cyclist operates the lever 19 in the direction indicated by the arrow A in FIG. 3, that is, in the direction corresponding to movement of the body 6 away from the end position, to cause engagement of the chain with the smallest-diameter sprocket, the lever 19 transmits a corresponding rotation to the main body 6 after it has been brought into the position relative to the main body 6 shown in FIG. 3. During the course of the above-described rotation of the lever 19, therefore, the retaining clamp 30 is in its deactivated condition and the main body 6 can rotate freely about the bush 7. At this stage, therefore, the cyclist only has to overcome the reaction of the derailer spring. Once the desired position has been reached, the lever can be released by the cyclist. Once it has been released, the lever 19 is brought into the position shown in FIG. 4, relative to the mainbody 6 (by virtue of the spring 34), so that the clamp 30 is brought into its active condition of coupling the body 6 for rotation with the bush 7. Spontaneous return of the lever 19 towards its starting position, by virtue of the return of the derailer spring, is thus prevented by the frictional resistance generated by the engagement of the two conical surfaces 12, 14 which are urged axially against each other by the Belleville washer 15 (the degree of this resistance may be adjusted by operation of the screw 17). When the cyclist subsequently wishes to move the lever into positions corresponding to engagement of the bicycle chain with sprockets of smaller diameter, that is, in the direction indicated by the arrow B in FIG. 4, he can achieve this operation by overcoming the frictional resistance with the aid of the derailer spring. In fact, when the lever 19 is rotated in the sense of the arrow B of FIG. 4, the lever is kept constantly in the position shown in FIG. 4, relative to the body 6, corresponding to the active condition of the retaining clamp 30. Rotation of the lever 19 therefore causes a corresponding rotation of the main body 6 and, with it, the bush 7 against the friction generated by the engagement of the two conical surfaces 12, 13.

In a possible variant, the hole for attachment of the end of the cable (hole 60, shown by a broken line in FIG. 1) is formed in the operating lever 19 instead of in the main body 6. In this case, the same derailer spring serves to keep the lever 19 in the position illustrated in FIG. 4, relative to the body 6, when the lever is not operated, so that the use of the spring 34 is no longer necessary.

Naturally, the principle of the invention remaining the same, the details of construction and forms of embodiment may be varied widely with respect to those described and illustrated purely by way of example, without thereby departing from the scope of the present invention.

I claim:

1. A device for operating the gear change of a bicycle comprising:

a support pin, a main body rotatably mounted on the support pin,;

an operating lever pivotably mounted on said main body for movement between two end positions, resilient means resiliently biasing said lever towards one of said end positions, a driven member adapted to be driven by the main body and rotatably mounted on the support pin, friction coupling means located disfased between the driven member and the support pin for opposing rotation of the driven member by means of frictional resistance, and one way engagement means located between the main body and the driven member for coupling the driven member to the main body for rotation only when the lever is rotated in a direction corresponding to movement of said lever towards said one of said end positions, wherein said one way engagement means is comprised of an engagement member carried by the main body and movable into engagement with said driven member to connect the main body for rotation with the driven member and said operating lever is connected to said engagement member whereby upon movement of said lever to said one of said end positions, said engagement member will be moved into engagement with said driven member and upon movement of said lever to another of said two end positions, said engagement member will be moved out of engagement with said driven member.

2. An operating device according to claim 1, wherein the driven member is constituted by a bush rotatably mounted on the support pin, and the engagement member is constituted by a clamp partially surrounding the bush and articulated at one end to the main body and at the opposite end to the operating lever, the clamp being adapted to grip the bush within it when the operating lever is moved to said one of said end portions.

3. An operating device according to claim 1, wherein the operating lever is articulated to the main body about an axis parallel to the axis of the support pin.

4. An operating device according to claim 2, wherein the friction coupling means are constituted by an end portion of the bush having a conical surface surrounding an axial opening in the bush and by an auxiliary bush mounted within the opening in the bush, locking means for locking the auxiliary bush against rotation on the support pin, the auxiliary bush having an enlarged end portion with a conical surface and spring means for urging the conical surface of the auxiliary bush axially against the conical surface of the bush.

5. An operating device according to claim 4, wherein the auxiliary bush is free to slide axially relative to the support pin and the support pin defines an axial threaded hole, and wherein said opening means is comprised of a Belleville washer for urging the conical surfaces against each other and a screw having a head for engaging and for adjusting the load of the washer, the screw being engaged in the hole in the support pin.

6. An operating device according to claim 1, wherein the main body is provided with a hole for attachment of the end of a cable for operating the rear derailer of the bicycle, and wherein said resilient means are interposed between the operating lever and the main body and tend to keep the operating lever in that operating position relative to the main body which corresponds to activation of the engagement mechanism.

7. An operating device according to claim 1, wherein the operating lever is provided with a hole for connection of the end of a cable for operating the rear derailer of the bicycle.

* * * * *